United States Patent [19]
Artnik et al.

[11] Patent Number: 5,343,506
[45] Date of Patent: Aug. 30, 1994

[54] NUCLEAR REACTOR INSTALLATION WITH A CORE CATCHER DEVICE AND METHOD FOR EXTERIOR COOLING OF THE LATTER BY NATURAL CIRCULATION

[75] Inventors: Josef Artnik, Bräuningshof; Dietmar Bittermann, Füth; Jürgen Eyink, Erlangen; Ulrich Fischer, Hannberg; Andreas Göbel, Neukirchen A. Brand; Sieghard Hellmann, Erlangen; Wolfgang Köhler, Kalchreuth; Walter Korn, Niederndorf; Hermann Plank, Adelsdorf; Manfred Scholz, Erlangen; Horst Weisshäupl, Herzogenaurach, all of Fed. Rep. of Germany

[73] Assignee: Siemens Aktiengesellschaft, Munich, Fed. Rep. of Germany

[21] Appl. No.: 80,405

[22] Filed: Jun. 21, 1993

[30] Foreign Application Priority Data

Dec. 21, 1990 [DE] Fed. Rep. of Germany ....... 4041295

[51] Int. Cl.$^5$ .................. G21C 15/18; G21C 9/016
[52] U.S. Cl. .................. 376/280; 376/289; 376/298
[58] Field of Search ............. 376/280, 282, 289, 299, 376/298; 976/DIG. 143

[56] References Cited
U.S. PATENT DOCUMENTS

| | | | |
|---|---|---|---|
| 3,607,630 | 8/1969 | West et al. | 376/280 |
| 4,003,785 | 1/1977 | Rau et al. | 376/280 |
| 4,342,621 | 8/1982 | Keating, Jr. | 376/280 |
| 4,442,065 | 4/1984 | Latter et al. | 376/280 |

FOREIGN PATENT DOCUMENTS

| | | |
|---|---|---|
| 0393805 | 10/1990 | European Pat. Off. . |
| 2035089 | 3/1971 | Fed. Rep. of Germany . |
| 2625357 | 12/1977 | Fed. Rep. of Germany . |
| 3520772 | 12/1986 | Fed. Rep. of Germany . |
| 52-70294 | 11/1977 | Japan . |
| 59-215755 | 12/1984 | Japan . |
| 63-294494 | 12/1988 | Japan . |
| 2236210 | 3/1991 | United Kingdom . |

Primary Examiner—Daniel D. Wasil
Attorney, Agent, or Firm—Herbert L. Lerner; Laurence A. Greenberg

[57] ABSTRACT

A nuclear reactor installation includes a reactor pressure vessel and a reactor core in the reactor pressure vessel. A supporting and protective structure supporting the reactor pressure vessel and surrounding the reactor pressure vessel on the bottom and laterally, has a bottom region and a circumferential wall. A core catcher device for the reactor core has a collecting basin for a core melt being installed below the reactor pressure vessel. The collecting basin has a bottom wall and a jacket wall being respectively separated from the bottom region and the circumferential wall of the supporting and protective structure by a spacing gap. Cooling channels are disposed in the spacing gap at the bottom wall and the jacket wall for exterior cooling of the collecting basin with a cooling liquid. Turbulence bodies are disposed in a surface region of the bottom wall for generating a turbulent flow of the cooling liquid flowing from the inside to the outside over the bottom wall toward the jacket wall. There is also a method for starting and maintaining exterior cooling of a core catcher device of a nuclear reactor installation.

27 Claims, 7 Drawing Sheets

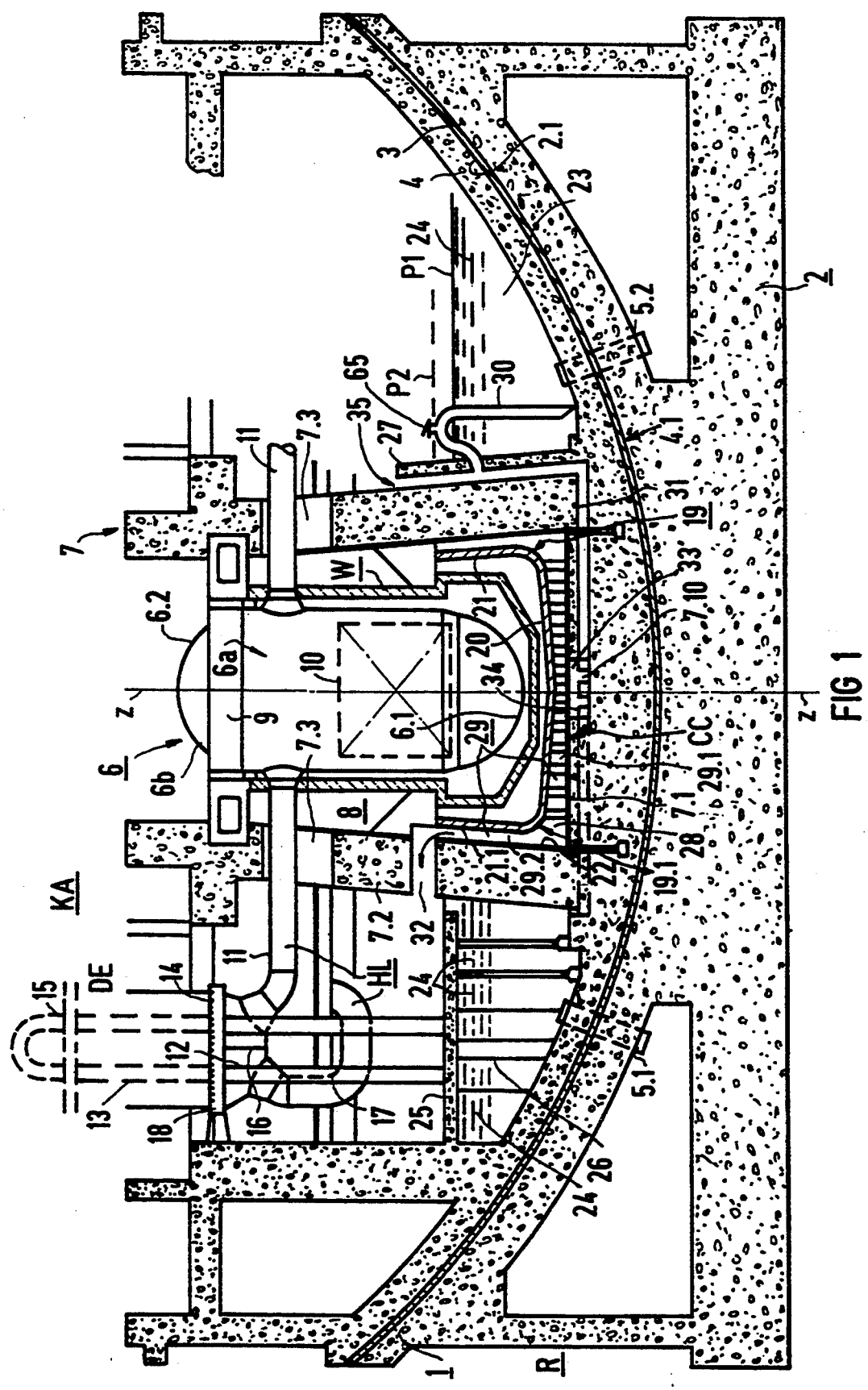

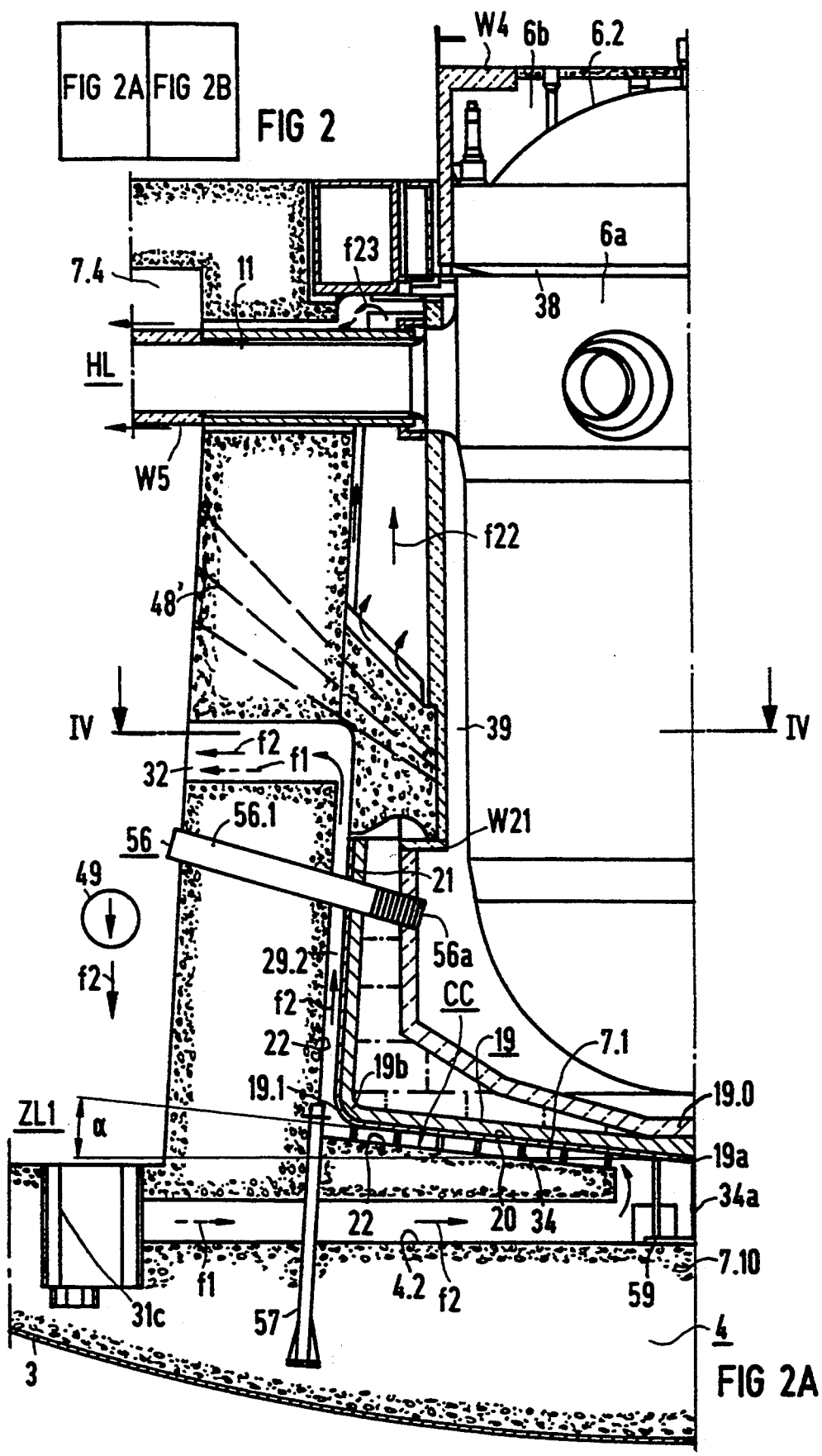

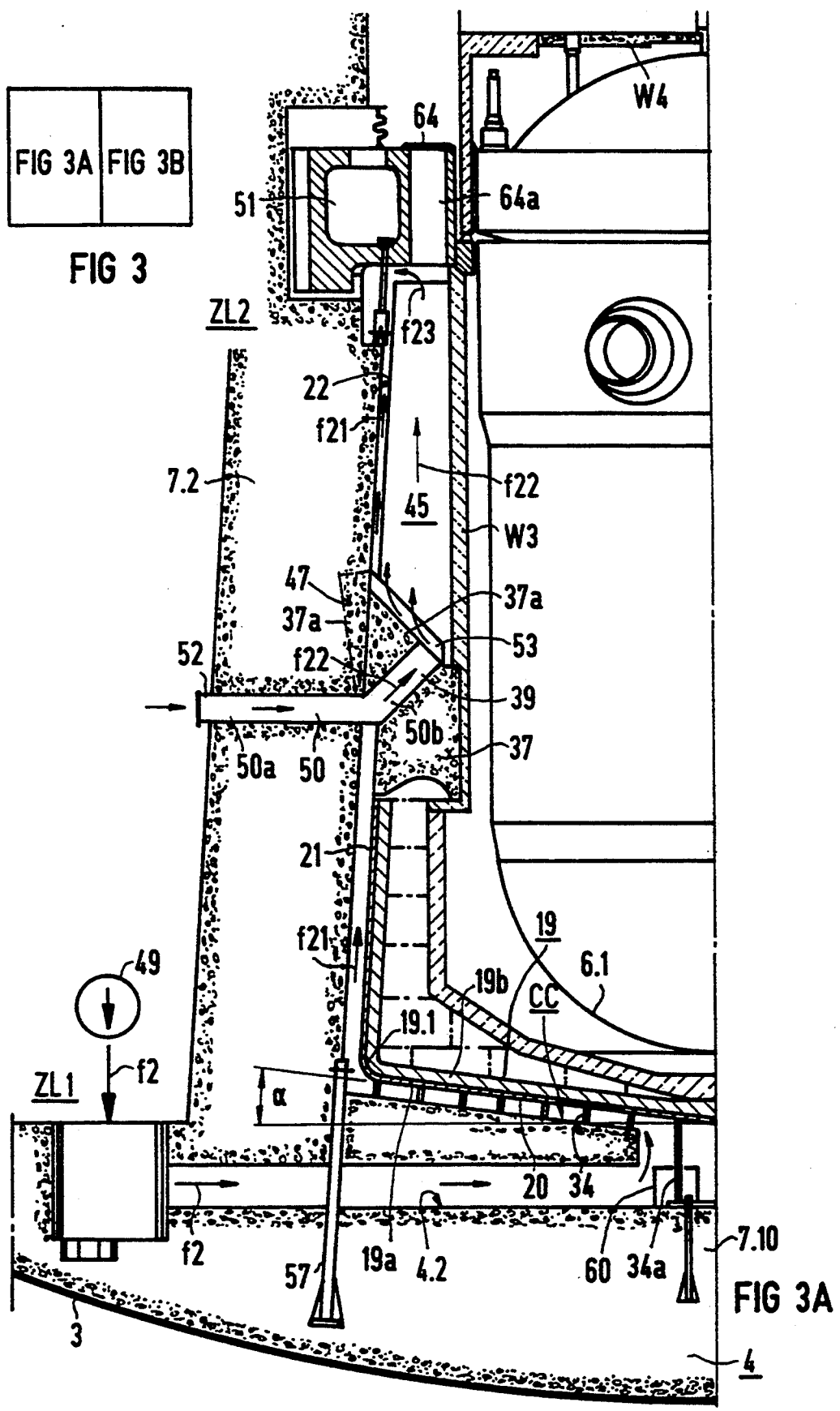

NUCLEAR REACTOR INSTALLATION WITH A CORE CATCHER DEVICE AND METHOD FOR EXTERIOR COOLING OF THE LATTER BY NATURAL CIRCULATION

CROSS-REFERENCE TO RELATED APPLICATION

This application is a Continuation of International Application Ser. No. PCT/DE91/00993 filed Dec. 18, 1991.

BACKGROUND OF THE INVENTION

Field of the Invention

The invention relates to a nuclear reactor installation, in particular for light water reactors, with a reactor pressure vessel having a reactor core and a core catcher device.

Such a nuclear reactor installation is known from U.S. Pat. No. 3,607,630. In addition, that known nuclear reactor installation has the following features: a supporting and protective structure delimits a reactor cavern with a bottom region and a circumferential wall, and the reactor pressure vessel, disposed in the reactor cavern at vertical and lateral distances in relation to the bottom region and the circumferential wall, is seated in the supporting and protective structure. In that case the core catcher device has a collecting basin for the core melt, which can be cooled by means of a coolant and is embedded within the reactor cavern and below the reactor pressure vessel in the bottom region of the supporting and protective structure. The collecting basin, which is also known as a "core catcher", is flat, pan-shaped and water-cooled internally. It is connected through an ascending pipe to a flood container disposed at a higher level. The wet steam forming in a hypothetical case of a core melt, i.e. when the core melt is distributed in the collecting basin, is blown off through outlet lines into the containment vessel or into condensation devices (steam separators). The condensed cooling water is returned to the flood container. The collecting basin is formed of a plurality of parallel tubes connected at the respective inlet and outlet ends to a common distribution or collection tube. However, the relatively good cooling properties of such a known collecting basin can be impaired, particularly in the case of nuclear reactors with higher output, if the tube structure of the collecting basin is deformed by large falling masses and the cooling cross sections are reduced or blocked by thereby.

The core catcher according to Published UK Application No. GB 2 236 210 A, has a collecting basin in "multilayer sandwich construction", with a bearing, downwardly arched steel pot, cladding of interlocked zirconium blocks and a steel skin covering the cladding at the top, which melts through in the case of an impacting core melt, i.e. it is sacrificed. Since the catch volume of the core catcher is relatively small and, alternatively to gas cooling, is only provided with a standing water column in the shield pit or reactor cavern, effective continuous cooling of the core melt (which in the beginning may have temperatures above 2000° C.) would only be possible with small reactor outputs, since otherwise film boiling could occur at the outer steel jacket of the core catcher, along with the danger of considerably reduced heat transfer.

SUMMARY OF THE INVENTION

It is accordingly an object of the invention to provide a nuclear reactor installation with a core catcher device and a method for exterior cooling of the latter by natural circulation, which overcome the hereinafore-mentioned disadvantages of the heretofore-known devices and methods of this general type and in which it is possible, by means of its collecting basin construction and support, to assure sufficient cooling channel cross sections and cooling of a possible core melt, even with increased reactor output and reactor core weights, without having to fear impairment of the structure defining the cooling channels by the deformation forces of impacting masses.

In addition, within the framework of subordinate and coordinate objects, it is intended in connection with a nuclear reactor installation according to the invention to provide requirements for cooling the collecting basin in accordance with the principle of natural circulation with a liquid and, in addition, to provide a dual cooling system (air cooling and water cooling) in such a way that, in the case of emergency cooling, air cooling is replaced, at least partially, by water cooling without special switching commands. Another subordinate object is effectively keeping away the radioactive radiation emanating from the bottom of the collecting basin in case of a core melt, from the wall sections located above the collecting basin of the supporting and protective structure. A further subordinate object is integrating a heat insulation surrounding the reactor pressure vessel into the system being formed of the collecting basin and dual cooling device.

Heretofore there has been no lack of suggestions for eliminating an incident of an accidental core melt through special safety measures. The recently developed safety philosophy assumes that it is better from the viewpoint of safety technology to include a core melt incident in the considerations, even though the possibility of its occurrence might be infinitely small. The invention is based on this viewpoint. A particularly effective protective barrier for preventing undesirable consequences of a core melt incident is intended to be provided by means of the invention.

Additional subsidiary objects connected with the above defined general objective ensue from the following considerations. It is desirable in connection with light water nuclear reactors in general, and with pressurized water nuclear reactors in particular, that the integrity of the containment be maintained in all assumed incidents, i.e. also in case of a core melt, regardless of whether it is a beginning partial core melt or a complete melt-through of the core. The following requirements in particular are set forth for controlling such an incident:

a. no fission products must be allowed to escape in large amounts from the core melt into the containment; instead, the core melt must remain covered by continuously cooled water (or another suitable liquid coolant), or a crust must be formed by means of cooling in order to achieve a catching effect;

b. the core melt must not be allowed to come into interaction with the concrete of the support structure of the safety container, at least not during the initial days of the event which exceeds the design specifications. That is also true because otherwise hydrogen, water vapor, non-condensable gases and other reaction products could be released;

c. cooling of the core melt over a long period of time must be assured, by means of which the post-decay heat is transferred to a heat sink and the melt is caused to harden and is maintained in a solid aggregate state over a long period of time; and d. large-size steam explosions, which can occur when large amounts of core melt mass fall or "plop" into a water bath, must be prevented.

With the foregoing and other objects in view there is provided, in accordance with the invention, a nuclear reactor installation, in particular a light water reactor installation, comprising a reactor pressure vessel, a reactor core in the reactor pressure vessel; a supporting and protective structure supporting the reactor pressure vessel and surrounding the reactor pressure vessel on the bottom and laterally, the supporting and protective structure having a bottom region and a circumferential wall; a core catcher device for the reactor core having a collecting basin for a core melt, which can be cooled by means of a cooling liquid and which is installed below the reactor pressure vessel, the collecting basin having a bottom wall and a jacket wall being respectively separated from the bottom region and the circumferential wall of the supporting and protective structure by a spacing gap; cooling channels disposed in the spacing gap at the bottom and on the sides for exterior cooling of the collecting basin with a cooling liquid; and turbulence bodies disposed in a surface region of the bottom wall for generating a turbulent flow of the cooling liquid flowing from the inside to the outside over the bottom wall toward the jacket wall.

Advantageous further embodiments of the subject of claim 1 are recited in dependent claims 2 to 21.

The advantages which can be attained by means of the invention are to be found mainly in the following: the collecting basin has such a height (at least approximately 3 m) that the minimum height for forming a naturally circulating flow is provided in liquid-filled cooling channels on the bottom and the sides (outer cooling system). The collecting basin protects the concrete of the supporting and protective structure (biological shield) not only with its bottom wall, but also with its upwardly extending jacket wall, against the effects of heat and radiation emanating from the reactor pressure vessel or a core melt. In this case the inner width (inner diameter) and the depth of the reactor cavern is suitably made sufficiently large so that, even with a sufficiently great spacing gap (=gap width of the outer cooling system), the collecting basin encloses a volume which permits the lining of the interior of the base body of the collecting basin, preferably a crucible made of a temperature-resistant steel alloy, with a protective layer and with masonry of shielding concrete blocks, while still providing sufficient receiving space for the possible core melt case. The crucible-like base body and the support by the turbulence bodies on its underside, in which case the turbulence bodies are in the form of turbulence-generating flow guidance bodies, can be easily constructed sufficiently strong and with a load-bearing capacity distributed over the base so that sufficiently large cooling cross sections can be maintained, even under great dynamic and static loads. Based on the large flow-through cross sections of the exterior cooling system, the naturally circulating flow with a corresponding coolant flow rate which can be generated and the generated turbulent flow, it is possible to make the exterior cooling of the collecting basin so effective that film boiling at the exterior cooling surfaces of the collecting basin can be prevented even under the greatest thermal loads.

In accordance with another feature of the invention, the cooling channels at the bottom are connected through an inlet channel configuration, and the cooling channels on the jacket are connected through an outlet channel configuration, to a cooling water reservoir provided outside of the supporting and protective structure and forming a reactor housing sump or being connected therewith with such lift that, with a hot collecting basin and water-filled cooling channels, a naturally circulating flow through the cooling channels is generated. The collecting basin can be seated while being suspended from the supporting and protective structure. For this purpose it can be provided, similar to a core container seated and suspended within a reactor pressure container, with a support flange, by means of which it is seated on corresponding support surfaces of the supporting and protective structure. However, the collecting basin is preferably seated on the bottom part of the supporting and protective structure by means of the turbulence bodies (which are then also support bodies), and a dual function (support and turbulence generating) can be achieved in this way. In order to allow for the unhindered heat expansion in the radial direction, the bottom wall of the collecting basin can be seated glidingly and/or resiliently on these support bodies, or the latter can be seated in this manner on the bottom region of the supporting and protective structure.

In accordance with a further feature of the invention, the collecting basin is a crucible and for this purpose its bottom wall is curved towards the bottom or the outside, wherein its bottom wall merges into the jacket wall through a rounded-off edge area, and the jacket wall preferably tapers slightly conically from the rounded-off edge area to the upper edge of the collecting basin.

In accordance with an added feature of the invention, the bottom wall of the collecting basin widens in the shape of a flat envelope of a cone from the lowest central area to the edge area, and the intersecting surfaces of which, located in axial-radial intersecting planes, extend with a slight angle of slope relative to the horizontal. This slight inclination and the rounding-off in the edge area make the bathing of the bottom and jacket walls of the collecting basin with cooling liquid, especially with water, easier in accordance with the natural circulating principle and in this way make effective cooling possible.

In accordance with an additional feature of the invention, in order to provide dynamically balanced even cooling of the collecting basin, an inlet channel configuration discharges into the cooling channels in the central area of the bottom wall of the collecting basin through an inlet chamber, the cooling channels on the bottom extend outwardly from the inlet chamber as far as the edge area of the collecting basin, and an upwardly extending cooling channel adjoins the edge area on the jacket side and terminates in the outlet channel configuration.

In accordance with yet another feature of the invention, the inlet channel configuration penetrates through the bottom region of the supporting and protective structure and extends from the bottom wall of a chamber forming the outer cooling water reservoir as far as the central area of the bottom wall of the collecting basin. Accordingly, the outlet channel configuration penetrates through the circumferential wall of the supporting and protective structure, forms a continuation of the cooling channel on the jacket and terminates in the area of the upper level of the cooling water reservoir.

In accordance with yet a further feature of the invention, in connection with the protective barrier function of the collecting basin, the base body of the collecting basin is formed of a crucible being formed of a non-corroding, temperature-resistant steel alloy, the interior bottom and jacket surfaces of the crucible are lined with a protective shell used for protecting the crucible material against attacks by the melt, and a sacrificial material deposit follows the protective shell as a second protective layer on the crucible, the amount of which is sufficient for reacting with the maximally possible volume of core melt entering the collecting basin in case of a possible incident.

In accordance with yet an added feature of the invention, the protective shell is formed of one of the following alloys, either singly or in combination: $MgO$, $UO_2$ or $ThO_2$.

In accordance with yet an additional feature of the invention, the sacrificial material deposit is a masonry structure of shielding concrete blocks.

Lining with a deposit of sacrificial material in the form of a granulate or an even more large-grained bulk material or preferably in the form of a masonry facing of shielding concrete blocks serves the purpose of altering the material values of the mixture in a directed way, for example for the purpose of:

protecting the wall of the collecting basin against high temperatures immediately following the penetration of the core melt into the collecting basin;

using up energy through melting the sacrificial material, with the result of delaying heating-up of the melt and thus being in a position of expecting lower values for the post-decay heat for cooling;

making the core melt more fluid;

increasing its heat conductivity;

increasing its surface;

improving the heat transfer from the core melt to the cooling surfaces;

preventing steam explosions by displacing volumes of water;

providing defined calculation bases by means of the known properties of the sacrificial material; and lowering the melting point of the mixture and the temperature of the melt.

In accordance with again another feature of the invention, the channel bodies mentioned above with regard to their property as flow guidance bodies for generating a turbulent flow in the exterior cooling system, are shaped as so-called delta wings in the form of prisms with three-sided surfaces and are fastened at least on the bottom of the supporting and protective surface located opposite the bottom wall with the cooling gap of the collecting basin. Such delta wings have proven themselves to be particularly effective for generating a turbulent flow in the cooling gap. The delta wings assist in preventing a film of steam on the underside of the plate through which the heat transfer number, which is decisive for heat transfer from the heated plate to the cooling water flow, would be undesirably reduced. The natural circulation in the cooling gap can be intensified by means of the generated turbulent flow in such a way, that it is possible to maintain a sufficient safe distance from the so-called critical heating surface load.

In accordance with again a further feature of the invention, the channel bodies are also used for support if they are constructed as pipe sockets, and the pipe sockets are provided on their ends facing the bottom wall portion of the collecting basin with channel recesses for generating partial cooling water flows, so that the latter also bathe the bottom wall in the area of the pipe sockets. These pipe sockets can be constructed either as simple flow guidance bodies or as turbulence-generating flow guidance bodies.

In accordance with again an added feature of the invention, when the pipe sockets are constructed as turbulence-generating flow guidance bodies, two respective U-shaped channel recesses aligned in the flow direction are provided per pipe socket and the ends thereof are made angular to increase turbulence.

As was already explained, the collecting basin also has a radiation shielding function. In accordance with again an additional feature of the invention, the radiation shielding system provided thereby is completed in an advantageous manner by installing a shielding ring above the collecting basin and adjoining it in the annular chamber between the circumferential wall of the supporting and protective structure and the outer periphery of the reactor pressure vessel. In particular, the shielding ring assumes the function of the biological shield in the circumferential area of the reactor core at those places where the circumferential wall (biological shield) is penetrated by outlet channels, so that the radioactive radiation emanating from the reactor core is kept away from the spaces outside the supporting and protective structure. Suitably the shielding ring is formed of shielding concrete, which is also called lecaconcrete. The shielding ring has a wall thickness closely approximating the wall thickness of the biological shield (supporting and protective structure) and preferably its extent in height is somewhat greater than its wall thickness. It is also advantageous to incline the top of the shielding ring, so that a larger annular surface is provided as the outlet cross section for air cooling channels.

In accordance with another feature of the invention, the shielding ring is anchored or braced on the circumferential wall of the supporting and protective structure.

In accordance with a further feature of the invention, the shielding ring is formed of prestressed concrete in particular, and its steel reinforcement is preferably combined into a uniform steel reinforcement system together with the steel reinforcement of the supporting and protective structure which also is formed of prestressed concrete. The shielding ring can be poured on site, in which case an appropriate masonry work has to be provided, or it can be assembled from individual ring segments which are pre-fabricated. In the latter case the ring segments of the shielding ring are advantageously interlocked with each other and with the circumferential wall of the supporting and protective structure.

In accordance with an added feature of the invention, the exterior cooling system of the collecting basin is constructed as a dual air and water cooling system which, during the normal operation of the nuclear reactor installation, i.e. when the exterior cooling system is dry, is used for air cooling of the nuclear reactor pressure vessel or of the outside of a thermal insulation enclosing it. For this purpose the inlet channel configuration is connected with a cooling air source and the outlet channel configuration is connected with a cooling air sink.

A thermal insulation adapted to the collecting basin and the shielding ring as well as to the dual cooling system is preferably put together of austenitic all-metal cassettes.

In accordance with an additional feature of the invention, there is provided a further air cooling system in addition to the exterior dual cooling system which is advantageously used for ventilating an upper air cooling chamber, that is disposed above the collecting basin and is limited at its inner periphery by the thermal insulation enclosing the reactor pressure vessel with an annular gap.

In accordance with yet another feature of the invention, the collecting basin is penetrated in the upper half of its jacket wall by at least one melt cooling tube which, with a multi-layer construction of the collecting basin, extends through its crucible wall, protective layer, sacrificial material deposit and thermal insulation, is sealed on its inner end by means of a melting plug, extends with a gradient from the outside to the inside and is attached on the inlet side to a cooling liquid reservoir, so that with a core melt present in the collecting basin, the melting plug is heated to its melting temperature and caused to melt and in this way a flow channel to the surface of the core melt for cooling liquid is opened. These features substantially assist in meeting the requirement made under a., above, as well as the requirement c., because surface cooling of the core melt can be achieved thereby. Such surface cooling is not problematic from a safety viewpoint, because the steam, which is not generated suddenly but instead develops continuously, can escape upward through the gaps and cooling gaps that are present and can also condense on the containment walls and the additionally installed recooling heat exchanger heating surfaces, so that the condensed water can again flow into the cooling water reservoir (sump water). Advantageously, the inlet of the melt cooling tube is located outside the supporting and protective structure and is connected with the cooling water reservoir, in which case the melt cooling tube therefore penetrates the circumferential wall of the supporting and protective structure and the spacing gap of the exterior cooling system.

With the objects of the invention in view, there is also provided a method for starting and maintaining exterior cooling of a core catcher device of a nuclear reactor installation, which comprises maintaining a cooling water level of the cooling water reservoir at a low water level, during normal operation of the nuclear reactor installation, at which no cooling water can reach the inlet channel configuration of the collecting basin cooling system; feeding emergency cooling water, when a leak occurs in the primary circuit, from the pressure reservoirs to be activated as a function of pressure of the primary circuit into the main coolant lines of the reactor pressure vessel, by feeding the emergency cooling water through the leak location and, if necessary, parallel thereto through further feed locations into the cooling water reservoir; and maintaining a sufficient water volume in the pressure reservoirs to lift the cooling water level of the cooling water reservoir up to a high water level for causing cooling water from the cooling water reservoir to reach the inlet channel configuration and from there the spacing gap of the collecting basin cooling system for filling the cooling system up to the level of the outlet channel configuration, for starting a naturally circulating flow, when the collecting basin is hot, from the cooling water reservoir through the inlet channel configuration to the cooling channels at the bottom wall and the jacket wall of the cooling system and from there through the outlet channel configuration back to the cooling water reservoir.

Through the use of this method, according to the object of the invention, the possibility is attained in the case of design or a layout incident to take prepared steps for initiating the naturally circulating cooling of the collecting basin and to employ them.

Other features which are considered as characteristic for the invention are set forth in the appended claims.

Although the invention is illustrated and described herein as embodied in a nuclear reactor installation with a core catcher device and a method for exterior cooling of the latter by natural circulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, longitudinal-sectional view of a lower area of a spherical safety vessel and an associated concrete foundation of a nuclear reactor installation and an associated core catcher device in accordance with the invention, wherein a reactor pressure vessel, a collecting basin located underneath it and a cooling water reservoir can be seen in particular;

FIGS. 2A and 2B are fragmentary, enlarged axial-sectional views of the subject matter of FIG. 1, which are taken along a sectional plane II—II of FIG. 4, in the direction of the arrows, according to a legend at the upper left of FIG. 2A, from which the collecting basin with its exterior cooling system can be seen even more clearly;

FIGS. 3A and 3B are fragmentary, axial-sectional views of the subject of FIG. 2, which are taken along a sectional plane III—III of FIG. 4, in the direction of the arrows, according to a legend at the upper left of FIG. 3A, that is turned at an angle of 77.5° in relation to the sectional plane II—II;

DESCRIPTION OF THE PREFERRED EMBODIMENTS

Figure 2B:
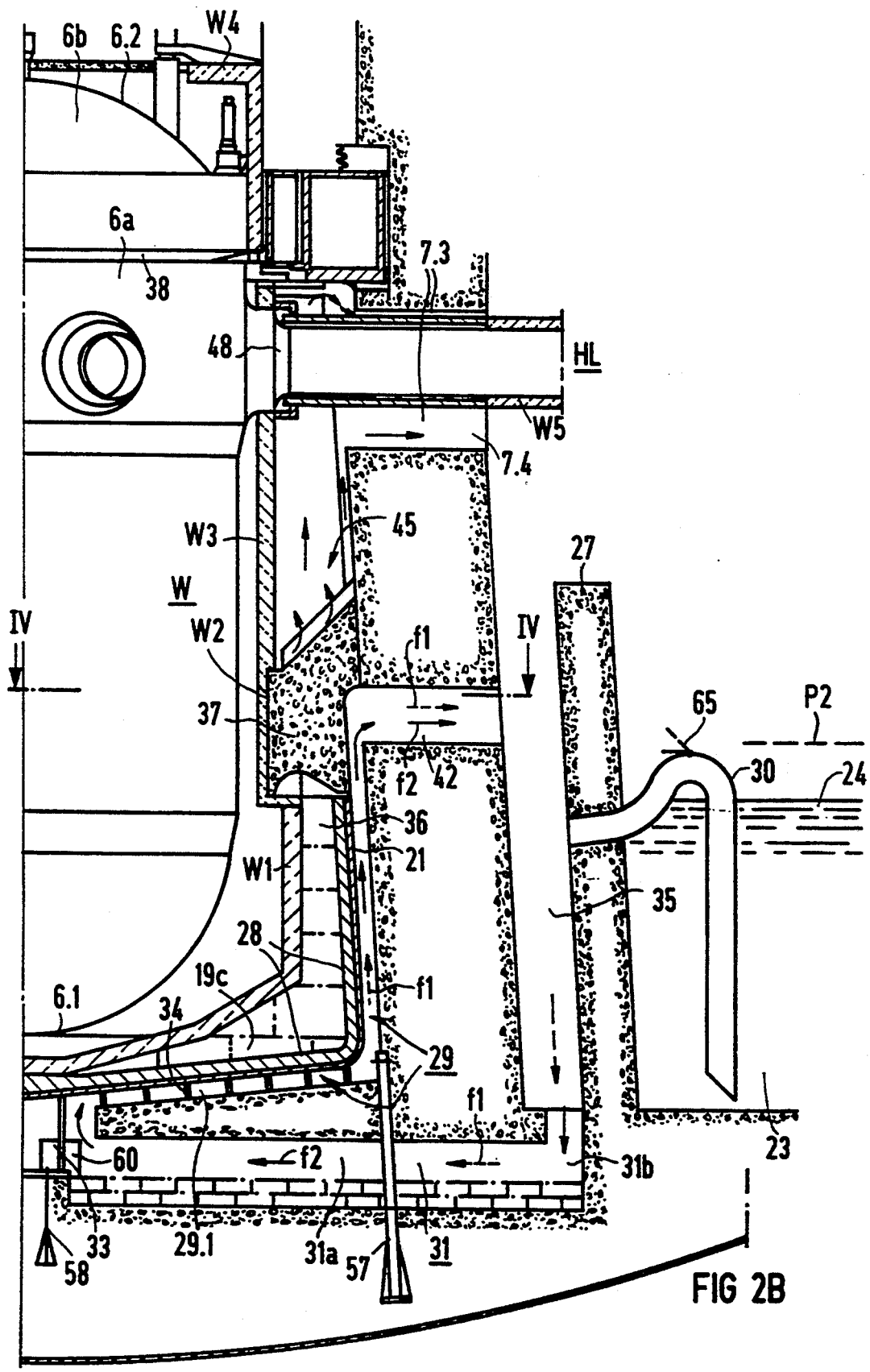

Referring now to the figures of the drawing in detail and first, particularly, to FIG. 1 thereof, there is seen a reactor building R shown in section, which includes a safety vessel 1 that is also referred to as a containment and is formed by a spherical steel sealing skin 3, a reinforced concrete foundation 2 having an appropriate spherical receiver 2.1, and a nuclear reactor installation KA being disposed inside the safety vessel 1 and including installation components and connecting lines of tubes, electrical lines and building structures which are enclosed in a gas-tight manner by the steel sealing skin 3. The latter is enclosed, including a gap, by a non-illustrated concrete containment shell connected with the reinforced concrete foundation 2 and protects the safety vessel 1 from effects from the outside ("Eva"). A concrete structure 4 of the safety vessel 1 is adapted by means of a downwardly oriented convex receiver 4.1 thereof to the convex steel sealing skin 3 and the correspondingly concave receiving surface 2.1 of the concrete foundation 2. At connecting points 5.1 and 5.2 thereof, the concrete structure 4 is connected with the reinforced concrete foundation 2 by means of anchor bolts sealingly penetrating the steel sealing skin 3.

A reactor pressure vessel of the pressurized water type, which is identified as a whole by reference numeral 6, is surrounded at a distance in the lateral and vertical direction by a supporting and protective structure 7. This supporting and protective structure 7, with a bottom or bottom region 7.1 and a circumferential wall 7.2 thereof is a component of the concrete structure 4 within the containment 1. A reactor cavern 8 is formed by the bottom region 7.1 and the circumferential wall 7.2, within which the reactor pressure vessel 6 is disposed. A central, recessed bottom part 7.10 of a preferably central inlet chamber 33 which will be described below, is also part of the bottom region 7.1. The essentially hollow-cylindrical reactor pressure vessel 6, having a vertical axis z and being formed of a lower part 6a with a bottom cup 6.1 and an upper part 6b with a top receiver 6.2, is suspended by its lower part 6a in a support ring structure 9. The support ring structure 9 is seated and secured against lifting and twisting, in an annular recess in the circumferential wall 7.2 of the supporting and protective structure 7. The reactor pressure vessel 6 is seated on the support ring structure 9 and is secured against twisting and lifting, within a circular recess with a flange of its lower part 6a and/or suitable lug supports, in a manner which is not shown in FIG. 1. A reactor core 10 is indicated by dashed lines. A steam generator DE of the primary circuit components of the nuclear reactor installation KA which is also shown, is connected to the reactor pressure vessel 6 through a so-called hot leg 11 of main coolant channels HL. The respective hot leg 11 (this is a multi-loop installation) guides hot coolant to a primary chamber 12 of the steam generator DE. The primary chamber 12 is separated from a secondary chamber 13 of the steam generator DE by a tube sheet 14 and U-shaped heat exchanger tubes indicated at reference numeral 15. In addition, the primary chamber 12 is divided by a separating wall 16 into two chamber halves. Thus, the primary coolant flows from the hot leg 11 over one half of the primary chamber 12 into the heat exchanger tubes 15, transfers its heat there to the secondary medium which turns into steam, and is fed back into the interior of the reactor pressure vessel 6 in a circuit through the other half of the primary chamber 12, a so-called cold leg 17 connected therewith, a non-illustrated primary coolant pump disposed in this cold leg 17, and the remainder of the cold leg 17. This can be a so-called two-loop installation, i.e. a pressurized water reactor with two steam generators and a pair of main coolant lines each. This would be the case in the exemplary embodiment of FIG. 1 if a cold leg 17 (only one is shown) were assigned to each of the two hot legs 11. However, it can also be a three-loop or four-loop installation, if it is contemplated that further pairs of legs are added in FIG. 1, or as can be seen from the illustrations in FIGS. 2 and 3. The steam generators DE are seated on the concrete structure 4 by means of support rings 18 in their tube sheet area.

A bottom wall 20 of a coolable collecting basin 19 of a core catcher device CC is disposed inside the reactor cavern 8 and below the reactor pressure vessel 6 and a jacket wall 21 of the collecting basin 19 extends upward from the bottom wall 20.

The circumferential wall 7.2 of the supporting and protective structure 7 which is vertical or is slightly inwardly inclined as is illustrated, is also referred to as a biological shield, because it constitutes a protective shield against neutrons and gamma radiation. The circumferential wall 7.2 is clad on its inner periphery with a steel liner 22, as are inside surfaces of the bottom region 7.1. Thus, the bottom region 7.1 and the circumferential wall 7.2 are outside of this liner 22 and at a vertical and lateral distance from the collecting basin 19 and are connected with the remainder of the concrete structure 4. The latter is built as a chambered structure, and a reactor sump in the form of a cooling water reservoir 24 with a normal level P1 is disposed in a chamber 23, which should be imagined to be in the approximate shape of a rotational solid and which surrounds the circumferential wall 7.2 (biological shield). A ceiling 25 of this chamber 23 is supported by steel walls 26. A separating wall 27, together with a U-shaped ascending pipe 30, constitutes an inlet structure of an inlet channel configuration 31. The main coolant lines (hot legs) 11 extend through appropriate wall openings 7.3 in the circumferential wall 7.2, and the cold legs 17 extend through similar openings which cannot be seen in FIG. 1.

Preferably, the jacket wall 21 of the collecting basin 19 extends approximately at least as far as the lower edge of the reactor core 10, as is illustrated. In this case, a spacing gap 28 is defined between the bottom wall 20 and the jacket wall 21 of the collecting basin 19 relative to the bottom 7.1 and the circumferential wall 7.2 of the supporting and protective structure 7. A cooling system 29 on the outside of the collecting basin 19 which has cooling channels 29.1, 29.2 at bottom and jacket sides is provided inside the spacing gap 28 for the purpose of exterior cooling of the collecting basin 19. The invention is not limited to the spherical containment 1 of FIGS. 1 to 3, but instead it can also be employed with a cylindrical containment, wherein the transition from the concrete structure 4 of the safety vessel 1 to the foundation 2 does not take place through spherical surfaces (as in the embodiment according to FIG. 1), but instead through level transition surfaces. Reference is made below to the detailed illustration in accordance with FIGS. 2 to 6 for further explanation. Parts which are the same as in FIG. 1 have the same reference numerals.

The cooling channels 29.1 at the bottom of the exterior cooling system 29 are connected through the inlet channel configuration 31, and the cooling channels 29.2 on the jacket are connected through an outlet channel configuration 32, to the cooling water reservoir 24 which is provided outside of the supporting and protective structure 7 and which forms a reactor housing sump or is connected therewith with such a lifting height that, with a hot collecting basin 19 and a water-filled cooling system 29, a naturally circulating flow in the cooling system 29 through the cooling channels 29.1 and 29.2 is generated. The inlet channel configuration 31 flows into the exterior cooling system 29 of the spacing gap 28 in the central area of the bottom wall 20 of the collecting basin 19 through the inlet chamber 33. The cooling channels 29.1, which are delimited by turbulence bodies 34 and the bottom wall 20 as well as the bottom region 7.1 of the supporting and protective structure 7, extend outward from the inlet chamber 33 as far as a rounded-off edge area 19.1 of the collecting basin 19. Following this, the upwardly leading cooling channel 29.2 on the jacket side extends from the edge area 19.1 as far as the outlet channel configuration 32. As can be seen from FIGS. 2 to 4, the inlet channel configuration 31 extends through the bottom region 7.1 of the supporting and protective structure 7. Inlet channels 31a extend in a star pattern or radially-horizontally from a short vertical inlet channel piece 31b to the inlet chamber 33. A vertical inlet channel piece is constructed as a pump sump chamber 31c of a non-illustrated pump, as is seen in the lower left part of FIGS. 2 and 3. An inlet chamber 35 is placed upstream of the inlet channel piece 31b and in normal operation is separated by the separating wall 27 from the chamber 23 of the cooling water reservoir 24. It is only when the normal level P1 of the cooling water rises, namely to a high water or minimum water level P2, that cooling water reaches the inlet chamber 35 and the remainder of the inlet channel configuration 31 through the ascending pipe 30, as will be described further below. The outlet channel configuration 32 penetrates the circumferential wall 7.2 of the supporting and protective structure 7, forms a continuation of the cooling channel 29.2 on the jacket side and empties into the cooling water reservoir 24 in the area of the upper level P2 of the reservoir 24, which can only be seen in FIG. 1.

Figure 4:
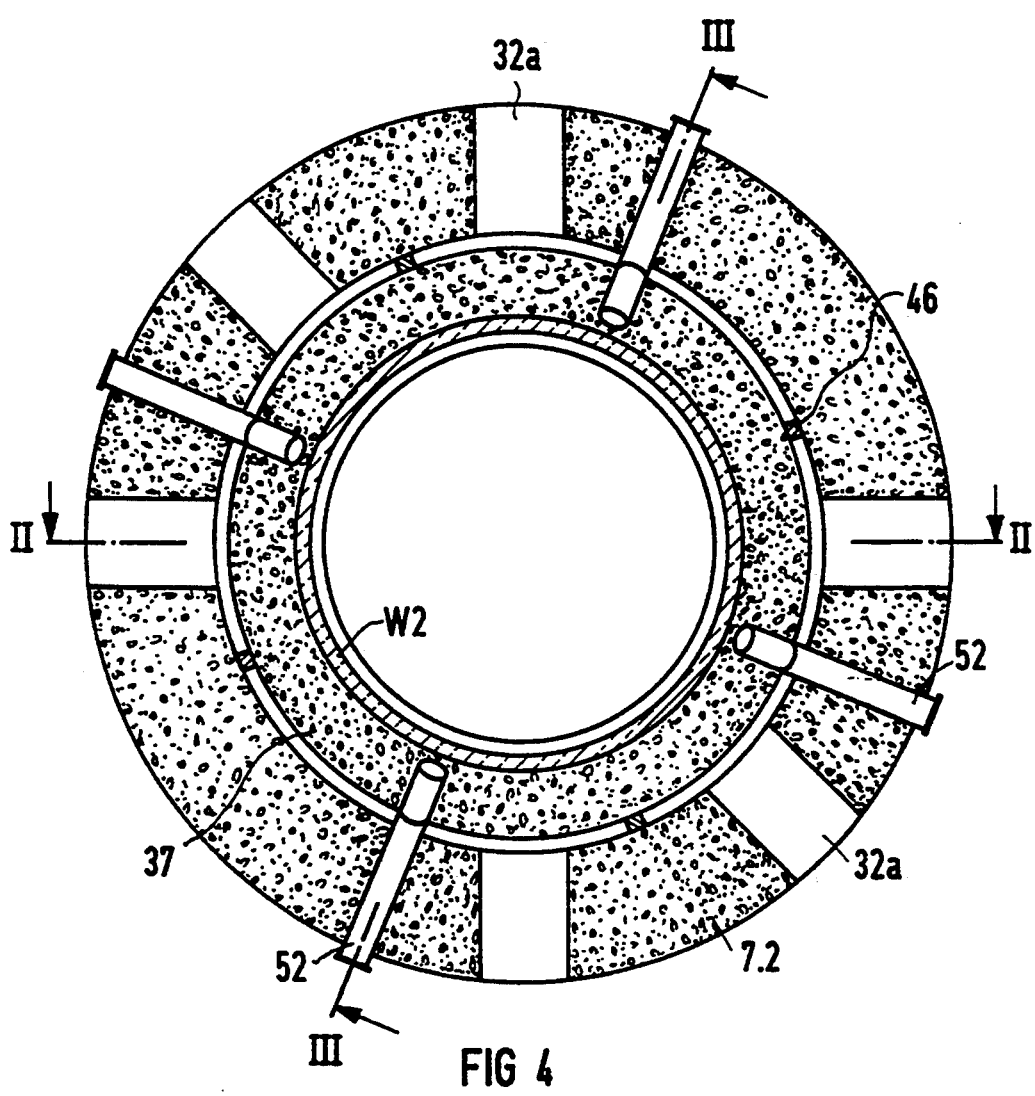
FIG. 4 is an axis-normal section taken along a sectional plane IV—IV of FIGS. 2A and 2B, in the direction of the arrows.

FIG. 4 shows that outlet channels 32a of the outlet channel configuration 32 are distributed over the circumferential wall 7.2. Six of the outlet channels 32a are shown. Four of the outlet channels 32a are in an axial crossing configuration and two additional outlet channels are in first and third quadrants of parts of the circumferential wall 7.2.

As can be seen in FIGS. 2 and 3 (as well as FIG. 1), the collecting basin 19 is constructed in the shape of a crucible, and in order to achieve this, its bottom wall 20 is curved downwardly or toward the exterior. The bottom wall 20 makes a transition into the jacket wall 21 through the rounded-off edge area 19.1. A base body 19a of the collecting basin 19 is formed as a crucible which is preferably formed of a temperature-resistant steel alloy. Interior bottom and jacket surfaces of the crucible 19a are clad with a protective shell 19b, which is used to protect the crucible material against an attack by the melt. Preferably, this protective shell 19b is formed of one of the following alloys: MgO, $UO_2$ or $ThO_2$. A sacrificial material deposit 19c follows the protective shell 19b as a second protective layer for the crucible 19a. This sacrificial material deposit 19c is preferably formed of shielding concrete blocks 36, which are connected with each other and the protective shell 19b for forming a masonry facing. A distance between the sacrificial material deposit 19c in the form of the masonry facing and the bottom cup 6.1 of the reactor pressure vessel, is sufficiently great to enable the surfaces of the masonry facing oriented toward the bottom cup to be clad with a heat-insulating shell W1. This heat-insulating shell W1 is the lower portion of a heat insulation which is indicated as a whole by reference symbol W, for the reactor pressure vessel 6. The lower insulating portion W1 has an approximately cup-shaped form. This lower insulating portion W1, as well as a central insulating portion W2 at the interior periphery of a shielding ring 37 and an upper insulating portion W3 extending from the shielding ring 37 to the region of a cover portion gap 38 of the reaction pressure vessel 6, all enclose the reactor pressure vessel 6 with a sufficient gap, so that an air chamber 39 is formed.

The collecting basin 19 therefore is a cup or crucible-like multi-layered structure, with the base body 19a in the shape of a crucible which can have a wall thickness of 50 mm, for example, and the protective shell 19b lining the interior surface of the crucible with a wall thickness three times that of the crucible. The wall thickness of this protective shell 19b is preferably increased in a central area 19.0 of the collecting vessel 19, because the greatest temperature stresses can occur in this area in the case of a possible core melt. As mentioned above, the sacrificial material deposit 19c, which is adapted to the contour of the crucible, follows the protective shell and the appropriately adapted lower insulation portion W1. Preferably, the jacket wall 21 of the crucible 19a, that is of the collecting vessel 19, extends from the rounded-off edge area 19.1 to an upper edge 21.1 seen in FIG. 1, in a conically tapering manner. Due to this structure, the contour of the crucible 19a or of the collecting vessel 19 is adapted to the contour of the outer periphery of the circumferential wall 7.2 of the supporting and protective structure 7, and a desired cross section for a spacing gap 28 or the cooling channels 29.2 of cooling system 29 on the jacket side is attained. The bottom wall portion 20 of the crucible 19a of the collecting basin 19 widens in the shape of a flat envelope of a cone from the lowest central area 19.0 to the edge area 19.1, and intersecting surfaces thereof that are located in axial-radial intersecting planes, extend with a slight angle of slope $a$ relative to the horizontal. This slight inclination of the bottom wall 20 which is present from the central area 19.0 to the edge area 19.1 results in defined flows of cooling water in the channel system 29, in which no air bubbles are formed or maintained (leading to an avoidance of so-called dead cooling zones). Instead, this slight inclination aids the natural circulation. Thus, there is a slight slope in the interior of the collecting basin 19 from the edge area 19.1 to the central area 19.0, so that a possible core melt will always collect in a centered manner in the collecting basin 19 (provided it is in the liquid state).

In accordance with a preferred embodiment, the collecting basin 19 is seated in the bottom region 7.1 of the supporting and protective structure 7 by means of the turbulence bodies 34. This does not preclude an additional support, where needed, by means of non-illustrated support bodies. It is also possible to provide turbulence bodies 34d which are only used for turbulence generation (and not for support), as will be described below by means of FIG. 5. The turbulence bodies 34 are inserted in the exterior cooling system 29 between the bottom wall 20 of the collecting basin 19 or the base body or crucible 19a and the bottom region 7.1 and are used for supporting the collecting basin 19 on the bottom region 7.1 and for generating a turbulent flow of the cooling liquid. In FIGS. 2 and 3, only turbulence bodies 34 are shown in the cooling channel 29.1 on the bottom which are not only used for flow guidance and turbulence generation, but also for support. This is also true for central turbulence bodies 34a disposed in the central area 19.0. These turbulence bodies 34a are supported on the central, recessed bottom part 7.10 which is part of the bottom region 7.1 and is located at the level of the lower wall 4.2 of the inlet channels 31. The turbulence bodies 34a are longer than the turbulence bodies 34, because they have to bridge a greater channel height of the inlet chamber 33. The turbulence bodies 34, 34a are distributed within the cooling channels 29.1 on the bottom and inside the inlet chamber 33, in such a way that an even weight transfer into the bottom region 7.1 of the supporting and protective structure 7 is assured, and cooling flow paths 40 seen in FIG. 5 can be formed along a path from the inside, i.e. from the central inlet chamber 33, radially outward to the edge area 19.1 and directed from there into the cooling channel 29.1. The latter is an annular channel. The cooling flow paths 40 can extend in their main direction along radii, i.e. they can be star-shaped or in the form of involutes, for example, in the course of which the turbulence bodies 34, 34a create a turbulence flow, particularly within the cooling channels 29.1 on the bottom when the naturally circulating flow is started in the cooling system.

Figure 5:
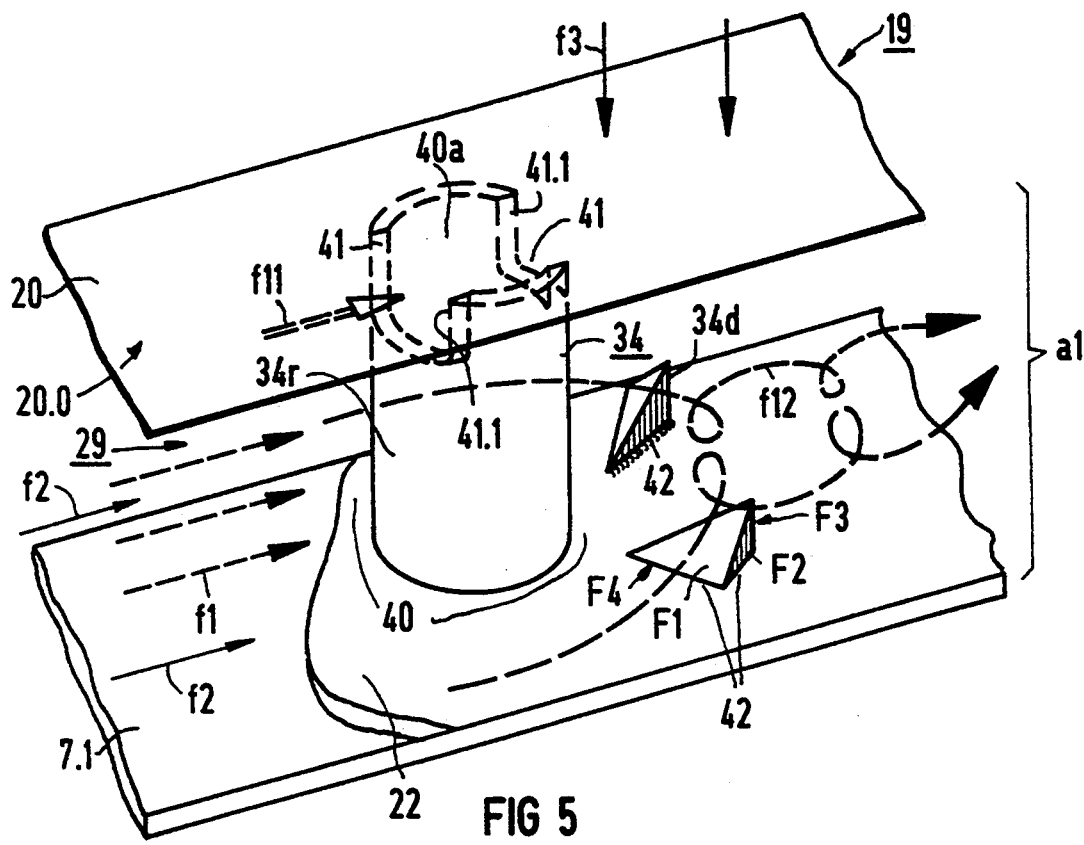
FIG. 5 is a fragmentary, further enlarged, perspective sectional view of a channel body being used as a support body for the collecting basin and as a flow guidance body and which for this purpose has been inserted between the bottom wall of the collecting basin and a bottom region of the supporting and protective structure, wherein so-called delta wings have been additionally disposed for generating turbulence in the cooling gap.
Figure 6:
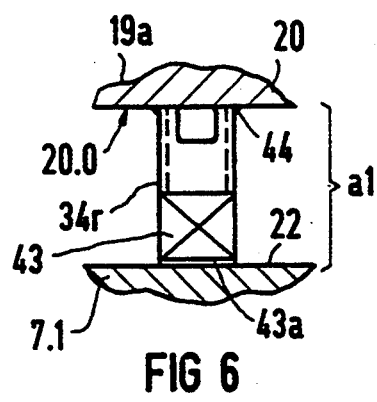
FIG. 6 is a fragmentary, sectional view of a channel body in accordance with FIG. 5, in which a spring element for the spring-elastic support can be seen.

FIGS. 5 and 6 show closer details of the structure and disposition of the turbulence bodies 34 (the same is correspondingly true for the turbulence bodies 34a). Flow arrows for cooling liquid, particularly cooling water, are generally indicated by reference symbol f1 and shown in dashed lines. Flow arrows for cooling air are generally indicated by reference symbol f2 and are shown in solid lines (also see FIGS. 1 to 3). Either only cooling air (solid arrows f2) or cooling water (dashed arrows f1) can flow in the cooling channels 29.1 and 29.2, which will be explained below. Heat flow arrows in FIG. 5 for the heat flow emanating from the reactor pressure vessel 6 or a possible core melt and penetrating the collecting basin 19, in particular its base body or crucible 19a and the bottom wall 20 of the crucible, are generally indicated by reference symbol f3 and shown in heavy solid lines. The arrows f1 therefore symbolize an emergency cooling water flow in the cooling system 29.

FIG. 5 is a diagrammatic, perspective view which shows a section of the cooling system 29, namely in the area of the bottom wall portion 20 of the collecting basin 19 and of the bottom 7.1 with the liner 22 of the supporting and protective structure 7 located opposite a cooling gap a1. The turbulence body 34 illustrated therein is constructed as a pipe socket (this embodiment preferably applies to all of the turbulence bodies 34 in FIGS. 1 to 3). In order to distinguish the pipe sockets from the other general turbulence bodies 34, these pipe sockets are designated by reference symbol 34r and in order to distinguish delta wings which generate turbulence and are still to be explained from the other general turbulence bodies 34, the delta wings are indicated by reference symbol 34d. The pipe sockets 34r are provided with channel recesses 41 on ends thereof facing the bottom wall portion 20 of the cooling basin 19. In particular, two U-shaped recesses 41 per pipe socket 34r are provided which are in alignment in the flow direction (main direction of the flow arrow fl) and have edges 41.1 thereof which are made angular to increase turbulence. Partial cooling water flows f11 are generated by the channel recesses 41 with their edges 41.1, which in the area of the turbulence bodies 34 in general and in the area of the pipe sockets 34r in particular are forced into contact with the cooling surfaces of the bottom wall portion 20. It is important to generate a sufficiently large turbulence of the flow within the cooling water flow paths 40 and the cooling paths 40a of the partial cooling water flows f11, to ensure that intimate mixing of the partial cooling water flows is achieved and the formation of a steam film on downwardly pointing cooling surfaces 20.0 of the bottom wall portion 20 is prevented. The so-called delta wings 34d which are in the shape of prisms with triangular surfaces F1 to F4 and which have the shape of tetrahedons, are provided for this purpose. These are fastened at least on the bottom 7.2 located opposite the cooling surface 20.0 within the cooling gap a1, or on the liner 22 of the bottom 7.2. The delta wings 34d or flow guidance bodies in general are preferably manufactured of corrosion-resistant steel which in composition is the same as the steel alloy of the liner 22 or is similar to it, so that they can be attached by welding, as is seen by weld beads that are indicated at reference numeral 42. For the sake of clarity, only two delta wings 34d are shown in FIG. 5, and the effect that these flow guidance bodies in the form of the delta wings 34d have on the otherwise mostly laminar flow is schematically indicated by spiraling flow lines f12. Strong turbulence is generated, which increases a safety distance against film boiling on the cooling surfaces 20.0.

It can be seen in FIG. 6, that the collecting basin 19 is supported on the bottom 7.1 through its pipe sockets 34r and in a spring-elastic manner with the interposition of a spring element 43. The pipe socket 34r is welded on the bottom wall 20 of the base body or crucible 19a of the collecting container 19 by weld beads 44, in which case again the steel alloys of the pipe sockets 34r and the crucible 19a are adapted to each other in such a way that a compatibility in relation to welding is assured.

The spring elements 43 can be helical pressure springs, which are supported by a lower spring plate 43a on the bottom parts 7.1 and through another non-illustrated spring plate at the upper end thereof on the pipe socket 34r. In place of helical pressure springs it is also possible to employ non-illustrated plate springs or plate spring packets, wherein helical pressure or plate springs are appropriately pre-stressed because of the heavy weight to be supported. The underside of the lower spring plate 43a is preferably finely worked, i.e. smoothed, so that the coefficients of friction relative to the adjoining surface of the steel liner 22 becomes as low as possible. By making a sliding movement possible, even if only over small distances, it is possible to prevent constraining forces during heating in the course of a hypothetical case of a core melt. The spring elements 43 can also be constructed as non-illustrated spring rods permitting spring-elastic yielding in the lateral direction to a limited extent.

The delta wings 34d shown in FIG. 5 can be used with advantage for the generation of a turbulent flow within a cooling channel, not only within the purview of the exemplary embodiment shown, but also in all places where a liquid coolant flows through the cooling channel and is delimited in the vertical direction by two channel walls disposed above each other and at a distance from each other, namely by an upper first channel wall heated by the heat to be dissipated, and a lower second channel wall provided on the inside with the delta wings 34r.

Referring again to FIGS. 1 to 3, it is noted that it would be possible in principle to suspend the collecting basin 19 with its crucible 19a from the supporting and protective structure 7. In this case the jacket wall 21, for example, could be upwardly extended and seated by means of a support flange on its upper end on a support ring inserted into an annular recess in the wall portions 7.2 in the supporting and protective structure 7, in a non-illustrated manner. In such an embodiment too, the turbulence bodies 34, 34a can be used, at least in part, as support bodies, i.e. not only as flow guidance bodies, or they can be disposed in a narrow gap below the bottom wall 20 as a safety measure against a crash. However, the embodiment shown with the seating of the collecting basin 19 on the channel bodies 34, 34a is more advantageous, because in this case the circumferential wall 7.2 (biological shield) is not additionally loaded. Instead, the transmission of the seating forces takes place over the considerably larger surface area of the concrete structure 4 and the bottom region 7.1.

Preferably, the collecting basin 19 extends at least as far as about the lower edge of the reactor core 10 seen in FIG. 1 and, as explained at the start, the required lifting height of at least approximately 3 m needed for the natural circulation of the cooling liquid through the cooling system 29 is therefore achieved. In this way, the collecting basin 19 encloses the entire bottom cup 6.1. With the extent in height of the collecting basin 19 as shown, it is a preferred feature of the embodiment to provide the shielding ring 37 seen in FIGS. 2 to 4, which is installed above the collecting basin 19 and adjoins it in an annular chamber 45 seen in FIGS. 2A and 3A between the circumferential wall 7.2 of the supporting and protective structure 7 and the outer periphery of the reactor pressure vessel 6. The shielding ring 37 assumes the function of the biological shield in the area of the core 10 seen in FIG. 1 in the places where the circumferential wall 7.2 (biological shield) is penetrated by outlet channels 32. The shielding ring 37 is preferably made of shielding concrete. Suitable compositions for such shielding concrete can be found in Table XXIV on page 701 of the book entitled: "Nutzenergie aus Atomkernen" [Useful Energy from Atomic Cores] by Dr. K. R. Schmidt, Vol. II, Walter D. Gruyter & Co., publishers, Berlin 1960, so that a detailed description thereof can be omitted herein. The shielding ring 37 is anchored on the circumferential wall 7.2 of the supporting and protective structure 7. Wedge-shaped bars 46 that are evenly distributed over the outer periphery of the shielding ring 37 can be provided for this purpose, as is shown in FIG. 4. It is also possible, such as is indicated by dashed lines in FIG. 3, to provide wedge-shaped support surfaces 47 on the circumferential wall 7.2, in which the shielding ring 37 is interlocked by means of wedge-shaped counter-surfaces 37a. It is advantageous for installing the shielding ring 37 if it is composed of non-illustrated individual ring segments. The ring segments then must be interlocked with each other and the circumferential wall 7.2 of the supporting and protective structure 7 as is seen in FIG. 3, or wedged against it as is seen in FIG. 4. According to another advantageous embodiment, the shielding ring 37 is made of shielding, prestressed concrete, and its steel reinforcement is combined into a uniform steel reinforcement system with the steel reinforcement of the supporting and protective structure 7 also being formed of prestressed concrete. Reinforcing steel cables 48' for such an embodiment are indicated by dashed lines in FIG. 2A. It is possible to provide additional ring clamping cables inside the shielding ring 37, by means of which the individual ring segments, which are interlocked with each other, are clamped together in the circumferential direction in a non-illustrated manner.

In order to minimize heat losses of the reactor pressure vessel 6 during normal operation, its heat insulation W seen in FIGS. 2 and 3, is of great importance. Of equal importance is the ventilation of this heat insulation on its exterior by the cooling air flows, which are symbolized in their totality by flow arrows f2. The heat insulation W includes the heat insulating portions W1 to W3 for the lower part 6a of the reactor pressure vessel 6, a movable or removable heat insulating hood W4 extending over the upper part 6b of the reactor pressure vessel 6, and additional heat insulating portions W5 for the main coolant lines HL. Essentially, three insulating portions that merge into each other are provided for the lower part 6a, namely: the lower insulating portion W1 which lines the sacrificial layer of the collecting basin 19 and encloses the bottom cup 6.1 of the reactor pressure vessel 6, the central insulating portion W2 lining the interior periphery of the shielding ring 37, and a ring-shaped connecting piece W21, which extends around the bottom of the shielding ring 37 and provides a connection between the lower insulating portion W1 and the upper insulating portion W3 extending from the shielding ring 37 to the area of the cover portion gaps 38 of the reactor pressure vessel 6 and which is penetrated by a main coolant connection 48. The main coolant connection 48, as well as the adjoining main coolant lines HL are enclosed by the additional insulating portions W5, as was mentioned above. The heat insulation W is preferably constructed of all-metal cassettes which are made of austenitic, i.e. corrosion-resistant steel. Appropriate fastening structures made of lightweight materials for securing these individual cassettes, which can be aligned to form a complete heat insulating shell, are not shown. The exterior cooling system 29 of the collecting basin 19 is constructed as a dual air and water cooling system which, in the normal operation of the nuclear reactor installation KA, i.e. with the exterior cooling system 29 dry, is used for air-cooling of the reactor pressure vessel 6, or for air-cooling of the exterior of the heat insulation W in general and the individual insulating portions W1 to W3 and W5 in particular. For this purpose, the inlet channel configuration 31 is connected to at least one cooling air source. In FIGS. 2A and 3A this source is schematically indicated as a cooling air blower 49. This blower represents a plurality of blowers which convey the cooling air in accordance with the arrow f2 into the inlet channel configuration 31 in the area of the pump sump chamber 31c. FIG. 2 shows the cooling air paths of the cooling air, which are superimposed on one another as is seen by the solid flow arrows f2, and the paths of the cooling water as is seen by the dashed flow arrows f1. In case of a hypothetical accident, the air cooling in the cooling system 29 smoothly transitions into water cooling of the collecting basin 19, which is still to be described. The outlet channel configuration 32 terminates in the containment and in this way provides a cooling air sink for the cooling air coming out of the cooling system 29, which therefore is used for indirect cooling of the outside of the lower insulating portion W1.

A further air cooling system which is superimposed on the dual cooling system indicated by the flow arrows f1 and f2 seen in FIG. 2, is indicated by flow arrows having reference symbols f21 to f23 in FIGS. 2 and 3. The entirety of the first air cooling system in accordance with the flow arrows f2 is identified by reference symbol ZL1, and the additional air cooling system in accordance with the flow arrows f21 to f23 is identified by reference symbol ZL2. In order to provide the air supply for this additional air cooling system ZL2, inlet channels 50 which penetrate the circumferential wall 7.2 of the supporting and protective structure 7 and the shielding ring 37 terminate in the upper air cooling annular chamber 45. This annular chamber 45 extends outside of the upper insulating portion W3 as far as a support ring structure 51 of the reactor pressure vessel 6 and is delimited on the exterior by the inner periphery of the circumferential wall 7.2. The upward-flowing cooling air is guided in a plurality of partial flows along the following cooling surfaces:

at the outer periphery of the upper insulating portion W3 and the inner periphery of the circumferential wall 7.2. In this case the flow of cooling air f22 comes from the inlet channels 50. The inlet channels 50 are formed of two channel parts: a first channel part 50a which penetrates the circumferential wall 7.2 and extends at a slight incline in the flow direction, and a second channel part 50b which penetrates the shielding ring obliquely upward at an angle of inclination of approximately 45°. The channel parts 50a, 50b, or the entire inlet channel 50, can be formed by brickwork channels 52, seen FIG. 4. In a mouth opening region of the inlet channels 50, the shielding ring 37 is provided with an inclined surface 37a, and a flow guidance sheet 53 covers each of the mouths of the inlet channel 50 and permits the cooling air to exit while being distributed over the cross section of the cooling air chamber 45 through non-illustrated outlet openings;

the cooling air flow f21 comes from the first cooling air system ZL1. The flow f21 is upwardly guided on the inner periphery of the circumferential wall 7.2 and forms a cooling air veil distributed over the circumference of the biological shield, which unites with the cooling air flows f22 above the cooling air chamber 45, forming the cooling air flow f23 that is also seen in FIG. 2, and flows along the exterior surfaces of a support ring structure 51, particularly along support arms 51a which support lug supports 54 of the reactor pressure vessel and along a seat or support 55 of the support ring structure 51;

furthermore, in accordance with FIG. 2A, outlet ring channels 7.4. are provided for the cooling air flows f23, in which case these outlet ring channels are formed between the main coolant lines HL and the inner periphery of wall openings 7.3 of the supporting and protective structure 7. From there the cooling air reaches the containment or the interior of the safety vessel 1 and from there it travels into a non-illustrated exhaust air filter installation.

An additional water cooling system for the surface of a possible core melt, which is suitably integrated into the air cooling systems ZL1 and ZL2 and the exterior cooling system 29 for water cooling, is located in the collecting basin 19 and has at least one melt cooling tube 56 shown in FIG. 2. For this purpose, the collecting basin 19 is penetrated in the upper half of its jacket wall by the at least one melt cooling tube 56 which, in the multi-layer construction of the collecting basin 19 as shown, extends through its crucible wall 19a, the protective layer 19b, the sacrificial material deposit 19c and the lower thermal insulation W1. An inner end of this melt cooling tube 56 is sealed by means of a melting plug 56a. As is shown, the melt cooling tube 56 extends with a gradient (for example, an angle of inclination of 20°) from the outside to the inside and is attached on the inlet side to a cooling liquid reservoir, which can be identical to the cooling water reservoir 24 of FIG. 1. With a core melt present in the collecting basin 19, the melting plug 56a is heated to its melting temperature (the melting temperature lies above the temperature reached in the air chamber 39, but far below the melting temperature of the core melt, for example at 600°). The melting plug 56a is caused to melt and in this way opens a flow channel for cooling liquid to the surface of the hypothetical core melt, so that it is additionally shielded upwardly by a water film and is cooled, and the evaporating coolant, particularly water vapor, can escape upwards through the cooling channels provided for air cooling. An inlet end 56.1 of the melt cooling tube 56 is located outside of the circumferential wall 7.2. It may be connected with the separately ascending pipe 30 shown in FIG. 2B or FIG. 1, so that when the cooling water enters the inlet channel configuration 31 and thus the cooling system 29 through the normal ascending pipe 30 in the course of a rising level, the melt cooling tube 56 is also correspondingly supplied with cooling water. Therefore, the illustrated embodiment is particularly advantageous, since the inlet 56.1 of the melt cooling tube 56 is located outside of the supporting and protective structure 7 and accordingly the melt cooling tube 56 penetrates the circumferential wall 7.2 of the supporting and protective structure 7 and the spacing gap 28 of the exterior cooling system 29.

Anchors 57 are used for anchoring the liner 22 and the entire supporting and protective structure 7 in the concrete structure 4. Although only two anchor points are shown, the anchors 57 connect the supporting and protective structure 7 with the concrete structure 4 at such a large number of anchor points that all forces and moments which are transmitted by the reactor pressure vessel 6 through the support structure or ring 51 shown in FIG. 3 on the supporting and protective structure 7 and vice versa are assuredly controlled. Besides the weight forces, these can also be lifting forces, tangential forces, tilting moments or lateral forces which may occur in case of an earthquake or structure disrupting event. In order to provide a more rapid reduction of overpressure which might build up in the collecting basin 19 during steam and gas generation, it can be practical to provide the shielding ring 37 with additional non-illustrated relief openings or overflow openings. It is furthermore recommended to fasten the heat insulation W or W1 to W3 on a relatively thin-walled insulation support container of stainless steel and to suspend this insulation support container on the support arms 51a of the support ring 51 through suitable protrusions or annular flanges and to fix it in place. In this way a particularly earthquake-proof and accident-proof fastening of the heat insulation W is assured. Such a non-illustrated insulation support container is advantageously provided with one or more inspection ports which can be closed by covers. In this way, installation of the insulation support container is made easier.

The support ring or the support ring structure 51 is connected to the liner 22 and therefore additionally to the circumferential wall 7.2 by clamping elements 66 for the liner. The support ring structure 51 can be welded or screwed together from forged ring segments with a sufficient number of sturdy lug support segments, for example eight, on which the support arms 51a are formed. Additional non-illustrated anchors are provided for the steel sealing skin 3 of the safety vessel 1. A base plate 59 is fastened by means of an anchor device 58 on the lower wall or channel bottom surface 4.2 which supports the turbulence bodies 34a and on which further flow guidance bodies 60 are fastened.

Figure 3B:
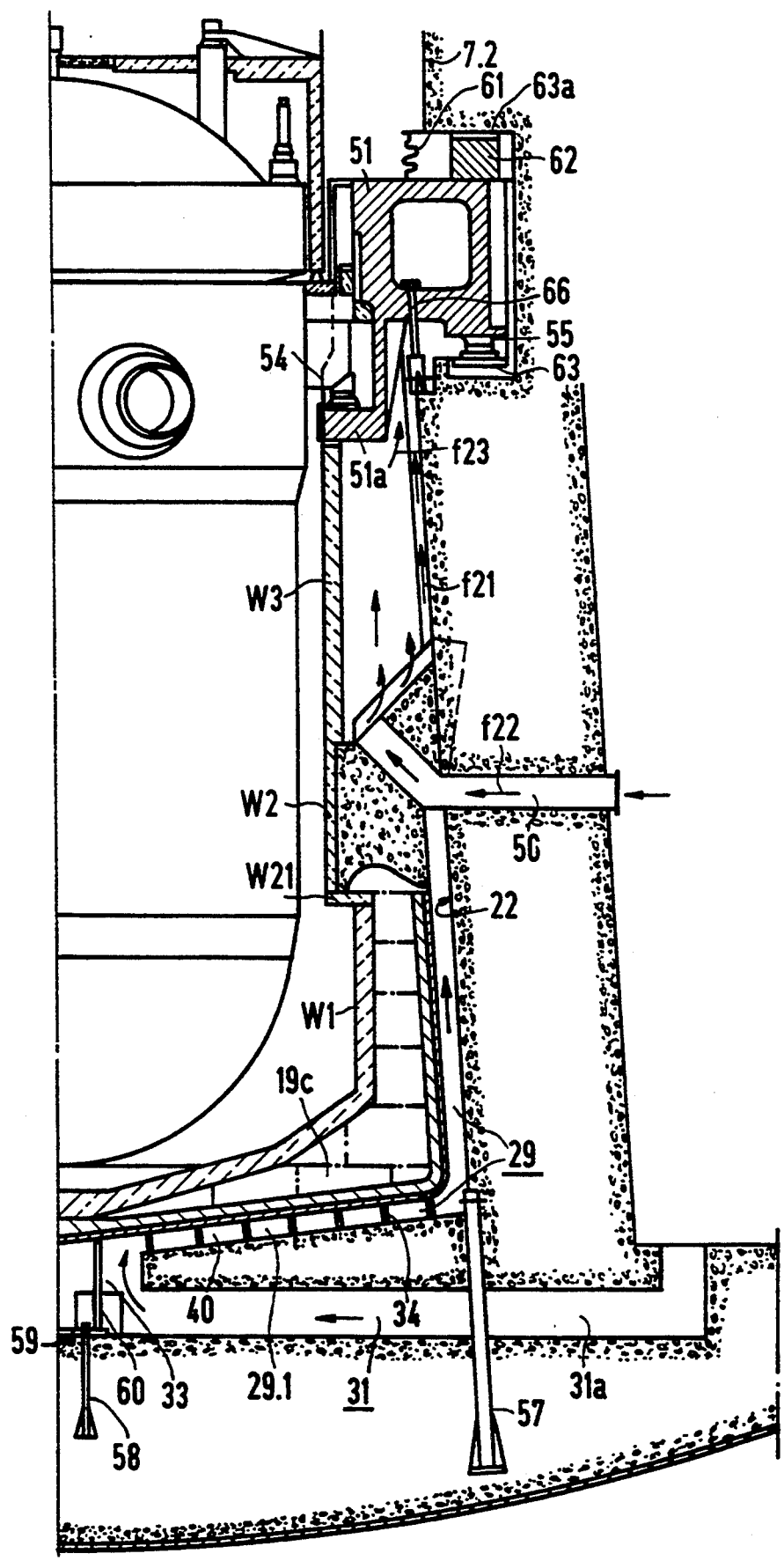

An upper region of FIG. 3B shows a so-called cover compensator 61 between the concrete structure of the circumferential wall 7.2 and the support ring 51. The latter is upwardly fixed by an upper counter seat 62, namely against a cover 63a for an annular recess 63 in the circumferential wall 7.2. A plug for a repeat test opening 64a in the support ring structure 51 is indicated by reference numeral 64.

As was mentioned above, it is possible by means of the invention to provide a method for initiating and maintaining an exterior emergency cooling of the collecting basin 19 of the nuclear reactor installation KA. Referring to FIGS. 1 and 2, the individual method steps are as follows:

during normal operation of the nuclear reactor installation KA, the cooling water level of the cooling water reservoir 24 is at the low water level P1, at which no cooling water but rather only cooling air in accordance with the flow arrow f2 can enter the inlet channel configuration 31 of the collecting basin cooling system 29, as was already explained;

for the continued course of the method it is assumed that an event exceeding the structural limitations is imminent or has already occurred. Such an event can be the result of an LOCA, for example, which will first be described below. In case of an LOCA (loss of coolant accident) it is postulated that a crack in one of the main coolant lines HL or a detachment of such a line has occurred. When such a leakage occurs in the primary circuit, emergency cooling water is pumped from the pressure reservoirs which can be activated as a function of the primary circuit pressure into the main coolant lines HL of the reactor pressure container 6, such as has been described in German Patent DE-PS 23 57 893. This is accomplished due to the fact that check valves react to the pressure decrease in the primary system (normally the pressure in the pressure reservoirs is lower than in the primary system). If this pressure reduction occurs as a result of a leak, the check valves open and the pressure reservoirs supply their contents to the main coolant lines HL on the cold as well as on the hot side. Through the use of this step the reactor core 10 is supplied with a sufficient amount of cooling water. Emergency cooling water then exits from the leak into the reactor sump or the cooling water reservoir 24, which has a level that slowly rises as a result. During this emergency cooling situation in the form of an LOCA, naturally all control rods have been inserted into the core ("scram"), i.e. the normal output operation of the nuclear reactor has been shut off, and only the so-called post-decay heat is generated in the core 10, which amounts to approximately 5% of the rated output of the nuclear reactor. Then, if the emergency cooling systems function satisfactorily, it is possible to sufficiently cool down the primary circuit and the secondary circuit after some time, so that a repair of the ripped or damaged main coolant line becomes possible. The non-illustrated volume of water in the pressure reservoirs is sufficient to raise the cooling water level of the cooling water reservoir 24 to the high water level P2 shown in dashed lines. Once this high water level P2 has been reached, cooling water is conveyed through the ascending pipe 30 (a plurality of such ascending pipes 30 can be distributed over the circumference of the separating wall 27) into the inlet chamber 35, and the cooling water flows from this inlet chamber 35 through the inlet channels 31b, 31a to the inlet chamber 33 and from there into the exterior cooling system 29. In accordance with the principle of communicating pipes, the exterior cooling system is filled with cooling water. However, there is no natural circulation yet, because the effect of heat on the collecting basin 19 due to a core melt is lacking. If the water rises in the ascending pipe 30 (which can also be described as a syphon), a check valve 65 opens. If the water should fall from the water level P2 to the water level P1 or lower, in accordance with the syphon principle water would still be conveyed through the ascending pipe 30 into the inlet chamber 35, because the check valve 65 is closed. The exterior cooling system 29 has been filled with cooling water because of the above-described course of the events as a preventive measure. Then, if the emergency cooling system which supplies emergency cooling water to the reactor pressure vessel through its main coolant lines HL should break down for any reason, so that the water level in the reactor pressure vessel 6 begins to fall, finally the core 10 seen in FIG. 1 will no longer be covered by cooling water and the remaining cooling water in the reactor pressure vessel 6 will also evaporate without a replacement being possible, if the hypothetical event of a core melt occurs. The collecting basin 19 with its external cooling system then is ready for such an event on its own and without any control commands, as described above. In other words, a core melt which following melting of the bottom cup or receiver 6.1 would at first drip and then flow into the collecting basin 19, would mix with the sacrificial material deposit 19c (after having melted through the heat insulation W1) and would be distributed inside the collecting basin 19. The heat flow would heat the crucible 19a correspondingly, along with the cooling water (that is still stationary) contained in the exterior cooling channels 29.1, 29.2. Due to the supply of heat to this cooling water column, a natural circulation could then develop, i.e. the heated cooling water could rise in accordance with the flow arrow f1 and leave the cooling system 29 through the outlet channel configuration 32. A portion of the cooling water would evaporate and condense on recoolers disposed inside the containment or on containment walls. The condensate would drip or flow back into the cooling water reservoir 24 and be available again for the circuit or the natural circulation cooling. After a defined amount of core melt has penetrated into the collecting basin 19, the radiation heat is so great that the melting plug 56a melts away. Then cooling water can flow through the melt cooling tube 56 to the surface of the core melt and can cool it also from above. In this way the core melt is intensely cooled from below through the crucible 19a and from above by means of the cooling water film. Since the protective material 19b also mixes with the core melt and forms an alloy with it, the melting point of which has been preferably lowered so that a liquifying effect is exerted on the melt, the heat dissipation from the core melt and its internal rolling cell flow is also favored by this process. Since the cooling water is available in sufficient amounts, the core melt is caused to set after some time, which can take several days. Some time will elapse after solidification until the core melt is completely cooled, and in this state the repair of the nuclear reactor installation can be begun. It is required for this purpose to decontaminate the nuclear reactor installation and to replace the damaged nuclear reactor pressure vessel 6, together with the collecting basin 19 containing the solidified core melt, with corresponding new components.

We claim:

1. A nuclear reactor installation, comprising:

a reactor pressure vessel, a reactor core in said reactor pressure vessel;

a supporting and protective structure supporting said reactor pressure vessel and surrounding said reactor pressure vessel on the bottom and laterally, said supporting and protective structure having a bottom region and a circumferential wall;

a core catcher device for said reactor core having a collecting basin for a core melt being installed below said reactor pressure vessel, said collecting basin having a bottom wall and a jacket wall being respectively separated from said bottom region and said circumferential wall of said supporting and protective structure by a spacing gap;

cooling channels disposed in said spacing gap at said bottom wall and said jacket wall for exterior cooling of said collecting basin with a cooling liquid; and turbulence bodies disposed in a surface region of said bottom wall for generating a turbulent flow of the cooling liquid flowing from the inside to the outside over said bottom wall toward said jacket wall.

2. The nuclear reactor installation according to claim 1, including a cooling water reservoir disposed outside said supporting and protective structure, an inlet channel configuration connecting said cooling channels at said bottom wall to said cooling water reservoir and an outlet channel configuration connecting said cooling channels at said jacket wall to said cooling water reservoir, said cooling water reservoir forming a reactor housing sump.

3. The nuclear reactor installation according to claim 1, including a cooling water reservoir disposed outside said supporting and protective structure, an inlet channel configuration connecting said cooling channels at said bottom wall to said cooling water reservoir and an outlet channel configuration connecting said cooling channels at said jacket wall to said cooling water reservoir, with a lift generating a naturally circulating flow through said cooling channels when said collecting basin is hot and said cooling channels are filled with water.

4. The nuclear reactor installation according to claim 1, including a reactor cavern being bounded by said bottom region and said circumferential wall of said supporting and protective structure, said reactor pressure vessel being disposed in said reactor cavern at vertical and lateral distances from said bottom region and said circumferential wall, said reactor pressure vessel being seated in said supporting and protective structure, and said jacket wall of said collecting basin being disposed at a height extending at least approximately to a lower edge of said reactor core.

5. The nuclear reactor installation according to claim 1, wherein said collecting basin is seated on said bottom region of said supporting and protective structure by said turbulence bodies.

6. The nuclear reactor installation according to claim 1, including support bodies with which said collecting basin is seated on said bottom region of said supporting and protective structure.

7. The nuclear reactor installation according to claim 1, including separate support bodies, said collecting basin being seated on said bottom region of said supporting and protective structure by said turbulence bodies and said separate support bodies.

8. The nuclear reactor installation according to claim 1, wherein said collecting basin is constructed in the form of a crucible with said bottom wall being curved towards the bottom and the outside, said collecting basin has an upper edge, said collecting basin has a rounded-off edge area forming a transition from said bottom wall to said jacket wall, and said jacket wall tapers slightly conically from said rounded-off edge area to said upper edge.

9. The nuclear reactor installation according to claim 8, wherein said bottom wall of said collecting basin has a lowest central area and widens in the shape of a flat envelope of a cone from said lowest central area to said edge area defining intersecting surfaces being located in axial-radial intersecting planes and extending with a slight angle of slope relative to the horizontal.

10. The nuclear reactor installation according to claim 9, including a cooling water reservoir disposed outside said supporting and protective structure, an inlet channel configuration connecting said cooling channels at said bottom wall to said cooling water reservoir and an outlet channel configuration connecting said cooling channels at said jacket wall to said cooling water reservoir, and an inlet chamber through which said inlet channel configuration discharges into said cooling channels at said bottom wall in said central area, said cooling channels at said bottom wall extending outwardly from said inlet chamber as far as said edge area of said collecting basin, and one of said cooling channels at said jacket wall extending upward, adjoins said edge area at said jacket wall and terminating in said outlet channel configuration.

11. The nuclear reactor installation according to claim 10, including a chamber receiving said cooling water reservoir, said inlet channel configuration penetrating through said bottom region of said supporting and protective structure and extending from said chamber as far as said central area of said bottom wall of said collecting basin, and said outlet channel configuration penetrating through said circumferential wall of said supporting and protective structure, forming a continuation of said cooling channel at said jacket wall and terminating in the vicinity of an upper level of said cooling water reservoir.

12. The nuclear reactor installation according to claim 1, wherein said collecting basin includes: a base body in the form of a crucible being formed of a temperature-resistant steel alloy material, a protective shell lining said bottom wall and said jacket wall inside said crucible for protecting said crucible material against attacks by the melt, and a sacrificial material deposit following said protective shell as another protective layer on said crucible, said sacrificial material deposit being sufficient in amount for reacting with a maximally possible volume of the core melt entering said collecting basin in case of a possible malfunction.

13. The nuclear reactor installation according to claim 12, wherein said protective shell is formed of at least one alloy selected from the group consisting of $MgO$, $UO_2$ and $ThO_2$.

14. The nuclear reactor installation according to claim 12, wherein said sacrificial material deposit is a masonry structure of shielding concrete blocks.

15. The nuclear reactor installation according to claim 1, wherein said turbulence bodies are delta wings in the shape of prisms having triangular surfaces being fastened on said bottom region of said supporting and protective structure opposite said collecting basin bottom wall with a cooling gap therebetween.

16. The nuclear reactor installation according to claim 1, wherein said turbulence bodies are pipe sockets having ends facing said bottom wall of said collecting basin, said ends of said pipe sockets having channel recesses formed therein for generating partial cooling water flows bathing said bottom wall in the area of said pipe sockets.

17. The nuclear reactor installation according to claim 16, wherein said channel recesses are U-shaped, each of said pipe sockets has two of said U-shaped channel recesses aligned in the flow direction, and said pipe sockets have angular ends at said U-shaped recesses for increasing turbulence.

18. The nuclear reactor installation according to claim 1, including a shielding ring being installed above and adjoining said collecting basin between said circumferential wall of said supporting and protective structure and the outer periphery of said reactor pressure vessel.

19. The nuclear reactor installation according to claim 18, wherein said shielding ring is anchored on said circumferential wall of said supporting and protective structure.

20. The nuclear reactor installation according to claim 18, wherein said supporting and protective structure is formed of prestressed concrete with a steel reinforcement, and said shielding ring is formed of shielding concrete and a steel reinforcement being united with said steel reinforcement of said supporting and protective structure into a uniform steel reinforcement system.

21. The nuclear reactor installation according to claim 12, wherein said reactor pressure vessel has an outer periphery, a lower part with a bottom cup, a cover portion gap and a main coolant connection, and including a shielding ring having an inner periphery, being installed above and adjoining said collecting basin between said circumferential wall of said supporting and protective structure and the outer periphery of said reactor pressure vessel, and a heat insulation surrounding said lower part of said reactor pressure vessel at a distance and being substantially divided into three insulating portions merging into each other, said insulating portions being:
 a. a lower insulating portion lining said sacrificial layer of said collecting basin and enclosing said bottom cup of said reactor pressure vessel,
 b. a central insulating portion lining said inner periphery of said shielding ring, and
 c. an upper insulating portion extending from said shielding ring to the area of said cover portion gap of said reactor pressure vessel and being penetrated by said main coolant connection.

22. The nuclear reactor installation according to claim 1, including a cooling water reservoir disposed outside said supporting and protective structure, an inlet channel configuration connecting said cooling channels at said bottom wall to said cooling water reservoir and an outlet channel configuration connecting said cooling channels at said jacket wall to said cooling water reservoir, a dual air and water exterior cooling system of said collecting basin for air cooling of said reactor pressure vessel during normal operation of the nuclear reactor installation when said exterior cooling system is dry, a cooling air source connected to said inlet channel configuration, and a cooling air sink connected to said outlet channel configuration.

23. The nuclear reactor installation according to claim 1, including a cooling water reservoir disposed outside said supporting and protective structure, an inlet channel configuration connecting said cooling channels at said bottom wall to said cooling water reservoir and an outlet channel configuration connecting said cooling channels at said jacket wall to said cooling water reservoir, a thermal insulation enclosing said reactor pressure vessel, a dual air and water exterior cooling system of said collecting basin for air cooling of said thermal insulation during normal operation of the nuclear reactor installation when said exterior cooling system is dry, a cooling air source connected to said inlet channel configuration, and a cooling air sink connected to said outlet channel configuration.

24. The nuclear reactor installation according to claim 23, including a containment, an exhaust air filter installation, a shielding ring being installed above and adjoining said collecting basin between said circumferential wall of said supporting and protective structure and the outer periphery of said reactor pressure vessel, said circumferential wall having an inner periphery, a support ring structure for said reactor pressure vessel having outer surfaces, a heat insulation for said reactor pressure vessel having a lower insulating portion, a central insulating portion and an upper insulating portion with an outer periphery, main coolant lines for said reactor pressure vessel having an outer periphery, wall openings in said supporting and protective structure having an inner periphery, outlet ring channels formed between the outer periphery of said main coolant lines and said inner periphery of said wall openings, and a further air cooling system for said reactor pressure vessel in addition to said exterior dual cooling system, having inlet channels for supplying air to said further air cooling system, said inlet channels penetrating said circumferential wall of said supporting and protective structure and said shielding ring and terminating in an upper cooling air chamber, said upper cooling air chamber extending outside said upper insulating portion to said support ring structure, for guiding upwardly flowing cooling air in several partial flows along cooling surfaces, said cooling surfaces being:
 the outer periphery of said upper insulating portion and the inner periphery of said circumferential wall of said supporting and protective wall,
 the outer surfaces of said support ring structure, and said outlet ring channels leading into said containment and said exhaust air filter installation.

25. The nuclear reactor installation according to claim 24, wherein the outer surfaces of said support ring structure include support arms, lug supports of the reactor pressure vessel being supported by said support arms, and seats of said support ring structure.

26. The nuclear reactor installation according to claim 12, wherein said collecting basin has a multi-layer construction and said crucible has a wall, and including a heat insulation for said reactor pressure vessel having a lower insulating portion, a central insulating portion and an upper insulating portion, a cooling liquid reservoir disposed outside said supporting and protective structure, at least one melt cooling tube penetrating said collecting basin in an upper half of said jacket wall and extending through said crucible wall, said protective layer, said sacrificial material deposit and said thermal insulation, said at least one melt cooling tube having an inlet side, an inner end and a melting plug sealing said inner end, said at least one melt cooling tube extending with a gradient from the outside to the inside and communicating on said inlet side with said cooling liquid reservoir, for heating said melting plug to its melting temperature with the core melt present in said collecting basin, causing said melting plug to melt and opening a flow channel to the surface of the core melt for cooling liquid.

27. A method for starting and maintaining exterior cooling of a core catcher device of a nuclear reactor installation having:

a reactor pressure vessel, a reactor core in the reactor pressure vessel, a primary circuit having main coolant lines leading to the reactor pressure vessel, pressure reservoirs communicating with the main coolant lines; a supporting and protective structure supporting the reactor pressure vessel and surrounding the reactor pressure vessel on the bottom and laterally, the supporting and protective structure having a bottom region and a circumferential wall; a core catcher device for the reactor core having a collecting basin for a core melt being installed below the reactor pressure vessel, the collecting basin having a bottom wall and a jacket wall being respectively separated from the bottom region and the circumferential wall of the supporting and protective structure by a spacing gap; a collecting basin cooling system having cooling channels disposed in the spacing gap at the bottom wall and the jacket wall for exterior cooling of the collecting basin with a cooling liquid; turbulence bodies disposed in a surface region of the bottom wall for generating a turbulent flow of the cooling liquid flowing from the inside to the outside over the bottom wall toward the jacket wall; and a cooling water reservoir disposed outside the supporting and protective structure, an inlet channel configuration connecting the cooling channels at the bottom wall to the cooling water reservoir and an outlet channel configuration connecting the cooling channels at the jacket wall to the cooling water reservoir, with a lift generating a naturally circulating flow through the cooling channels when the collecting basin is hot and the cooling channels are filled with water;

the method which comprises:

maintaining a cooling water level of the cooling water reservoir at a low water level, during normal operation of the nuclear reactor installation, at which no cooling water can reach the inlet channel configuration of the collecting basin cooling system, feeding emergency cooling water, when a leak occurs in the primary circuit, from the pressure reservoirs to be activated as a function of pressure of the primary circuit into the main coolant lines of the reactor pressure vessel, by feeding the emergency cooling water through the leak location and, if necessary, parallel thereto through further feed locations into the cooling water reservoir, and maintaining a sufficient water volume in the pressure reservoirs to lift the cooling water level of the cooling water reservoir up to a high water level for causing cooling water from the cooling water reservoir to reach the inlet channel configuration and from there the spacing gap of the collecting basin cooling system for filling the cooling system up to the level of the outlet channel configuration, for starting a naturally circulating flow, when the collecting basin is hot, from the cooling water reservoir through the inlet channel configuration to the cooling channels at the bottom wall and the jacket wall of the cooling system and from there through the outlet channel configuration back to the cooling water reservoir.

* * * * *